ated Patent [19]

United States Patent [19]
Schertler

[11] Patent Number: 4,470,576
[45] Date of Patent: Sep. 11, 1984

[54] SLIDE VALVE ASSEMBLY
[76] Inventor: Siegfried Schertler, In der Au 6, CH-9469 Haag, Switzerland
[21] Appl. No.: 473,739
[22] Filed: Mar. 9, 1983
[30] Foreign Application Priority Data
Mar. 13, 1982 [DE] Fed. Rep. of Germany ....... 3209217
[51] Int. Cl.³ .......................................... F16K 25/00
[52] U.S. Cl. .................................. 251/158; 251/167; 251/193; 251/204
[58] Field of Search ............... 251/158, 167, 193, 203, 251/204

[56] References Cited
U.S. PATENT DOCUMENTS

| 3,185,435 | 5/1965 | Hauser | 251/158 |
| 3,216,694 | 11/1965 | Perazoue | 251/158 |
| 3,237,916 | 3/1966 | Bryant | 251/158 |
| 4,291,861 | 9/1981 | Faria | 251/158 |

Primary Examiner—Harold W. Weakley
Attorney, Agent, or Firm—Toren, McGeady and Stanger

[57] ABSTRACT

Opening and closing of a fluid flow path is controlled by a valve closure member which consists of both a sealing plate and a counter element and which is moved within its own plane to open and close the valve assembly by a crank rod. Spreading elements are arranged between the sealing plate and the counter element tending to urge these members apart and the crank rod mechanism includes a slide member which is arranged to move within a guide slot in the sealing plate and to also engage a circumferential edge of the counter element so that during closing movement of the sealing plate by engagement of the slide member in the guide slot, the slide member may also extend to engage the circumferential edge of the counter element to rotate the counter element relative to the sealing plate in order to place the spreading elements in position to apply a sealing force between the sealing plate and counter element.

8 Claims, 4 Drawing Figures

SLIDE VALVE ASSEMBLY

The present invention is directed generally to valve devices and more particularly to a slide valve applicable to effect fluid-tight closure or sealing in pipelines or container openings for high vacuum apparatus.

The type of valve device to which the present invention relates generally includes a closure body which may be displaced by means of a crank rod mechanism and which is formed to include a sealing plate and a counter element arranged in opposed relationship with the sealing plate. Spreading elements are arranged at the closure member between the counter element and the sealing plate in order to apply a force tending to spread apart the sealing plate and the counter element when the closure member is in the sealing position after displacement of the closure member from the closing position. In doing so, the spreading elements tend to press the sealing plate against a valve seat of the valve assembly so as to enhance the sealing action of the closure member. In such devices, the closure body is guided in a nonrotatable manner within the plane of its own surface on its displacement path by means of sliding members or rollers engaging within a housing of the valve assembly. The closure body has a connecting link guide which extends transversely relative to its displacement direction for receiving a connecting link slide member connected with the crank rod mechanism. In slide valves of this type known in the prior art, the counter element is formed by means of a carriage with laterally arranged rollers which slide and roll in the corresponding guides in the housing. The sealing plate is connected with the carriage by means of two pairs of levers arranged laterally at the carriage in order to enable pivotal motion. At the side remote from the connecting link guide, the sealing plate is formed with two stops with which it contacts correspondingly constructed abutment faces in the housing at the closing position of the valve.

If the closure member is driven or moved into the closing position by actuation of the crank rod arrangement, the stops which are provided form a working connection with the abutment faces in the housing and in so doing eliminate further movement of the sealing plate within its plane.

If closing or blowdown pressure is now applied by means of the rod arrangement, the counter element which is laterally guided in the housing will move further and as a result the pivotal level pairs will fold up whereby the sealing plate with its stops contacting the abutments will slide against the valve seat. Springs are also arranged between the sealing plate and the counter element and the springs pull the sealing plate and the counter element against one another when the closure body is relieved of load. A crank drive is provided as an actuation rod mechanism.

Slide valve arrangements of this type are generally suited for ensuring and maintaining an at least one-sided seal. The disadvantages consist in that employment in high vacuum apparatus is restricted since the surfaces which are pressed together, i.e., the stops or abutments, slide on one another under pressure when the valve is sealingly closed. Since no lubricants can be provided in high vacuum apparatus and unlubricated metal surfaces thereby contact and slide against one another under high pressure, the metal surfaces which are thus stressed will be worn and damaged within a very short period of time particularly when high pressures are prevalent. Thus, cold welding of parts may result.

Another known closing mechanism having a displaceable closing valve body comprises two plates which are parallel to one another and which are drawn back relative to one another by means of an elastic device. An intermediate plate is arranged between the two plates wherein the two plates and the intermediate plate are pivotally displaceably mounted on a common hub perpendicular to the plates. By means of rollers which run upon upon ramps, the plates are pressed apart when the intermediate plate swings between the two plates. A crank rod or connecting rod mechanism serves to displace the closing body, and the head of the crank rod is wedged upon the actuation shaft with its other end entering a radially arranged opening of the intermediate plate and a tangentially arranged opening of each of the two plates. Moreover, a locking device is here provided which, on the one hand, holds the plates close to one another in the open position until the intermediate position is reached, wherein the closing body is located at the level of the connection flanges, and it blocks them relative to the intermediate plate. On the other hand, it operates to block the plates between the intermediate position and the closure position as well as in the closure position with respect to rotation and displacement relative to the housing of the closing means.

This locking device is composed of a pair of balls each of which sits in a plate and engage between the open position and the intermediate position in a recess of the intermediate plate. The balls move along the inner wall of the housing and catch in a recess of an inner wall of the housing between the intermediate and the closure positions wherein they move along the intermediate plate subsequently during further actuation of the adjusting mechanism.

Such a construction is, however, not suited for employment in high vacuum apparatus because the balls which serve as the locking means cannot roll freely. That is, if the closing body is driven into the pass-through opening of the closing means from the lateral position, then the balls will drag along at the inner wall of the housing since they contact surfaces on both sides which surfaces are moved relative to one another under pressure with one of the surfaces being at rest with respect to the ball. Since as has been previously mentioned, no lubricants can be provided in high vacuum apparatus and since, accordingly, unlubricated metal surfaces contact one another and slide against one another under pressure, the metal surfaces which are thus stressed will be worn and damaged within a short time or if sufficiently high pressure is developed cold welding may result which will damage the closing means and render the valve useless.

Accordingly, the present invention is directed toward providing a slide valve assembly which is constructed in such a way that no sliding movements occur between metal surfaces pressed against one another during employment of the valve. More particularly, the invention is directed toward providing a valve structure whereby a tight sealing force may be produced without requiring that unlubricated metal surfaces be abrasively moved relative to each other.

SUMMARY OF THE INVENTION

Briefly, the present invention may be defined as a slide valve assembly particularly for fluid-tight closure of flow passages in high vacuum apparatus comprising: housing means defining a valve seat; a generally planar valve closure member comprising a sealing plate and a counter element, said sealing plate being adapted to be brought into sealing engagement against said valve seat so as to close said valve assembly; a crank rod mechanism for moving said closure member between a valve-opened position and a valve-closed position; spreading elements arranged at said closure member so as to be supported against said sealing plate and said counter element in order to spread apart said sealing plate and said counter element to press said sealing plate against said valve seat to effect sealing closure of said valve assembly; guide means interposed between said valve closure member and said housing means for guiding movement of said closure member along a displacement path generally in its own plane; a connecting link slide member on said crank rod mechanism engaging said closure member; a connecting link guide slot in said closure member extending transversely to the displacement direction thereof receiving said connecting link slide member therein, said connecting link guide slot being formed in said sealing plate; said counter element being constructed as a disc rotatable relative to said sealing plate and with a circumferential edge which projects into the path of said connecting link slide member; said crank rod mechanism operating to actuate said sealing plate through engagement of said connecting link slide member in said guide slot and to also actuate said counter element for rotative movement relative to said sealing plate by engagement of said slide member against said circumferential edge.

Thus, the advantages of the invention are achieved in view of the characteristic features thereof which include: that the connecting link guide slot is provided in the sealing plate and that the counter element is constructed as a disc-type member which is rotatable relative to the sealing plate. In a preferred embodiment of the invention, the counter element is rotatively mounted upon a pin or trunnion attached to the sealing plate. The circumferential edge on the counter element projects into the area traversed by the slide member of the crank mechanism when the valve is sealingly closed when the closure member is driven into the closing position and is thereby rotated.

The spreading elements may be provided in the form of rolling bodies such as spherical balls arranged between the sealing plate and the counter element. The rolling bodies are arranged to move on sloped surfaces which are provided in each instance at least in pairs. It is preferable if the connecting link slide member be formed from two adjacent, freely rotatable rollers having a common axis wherein one of the rollers runs in the guide slot of the sealing plate and the other roller engages at the circumferential edge of the counter element when the valve is moved into a sealing position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
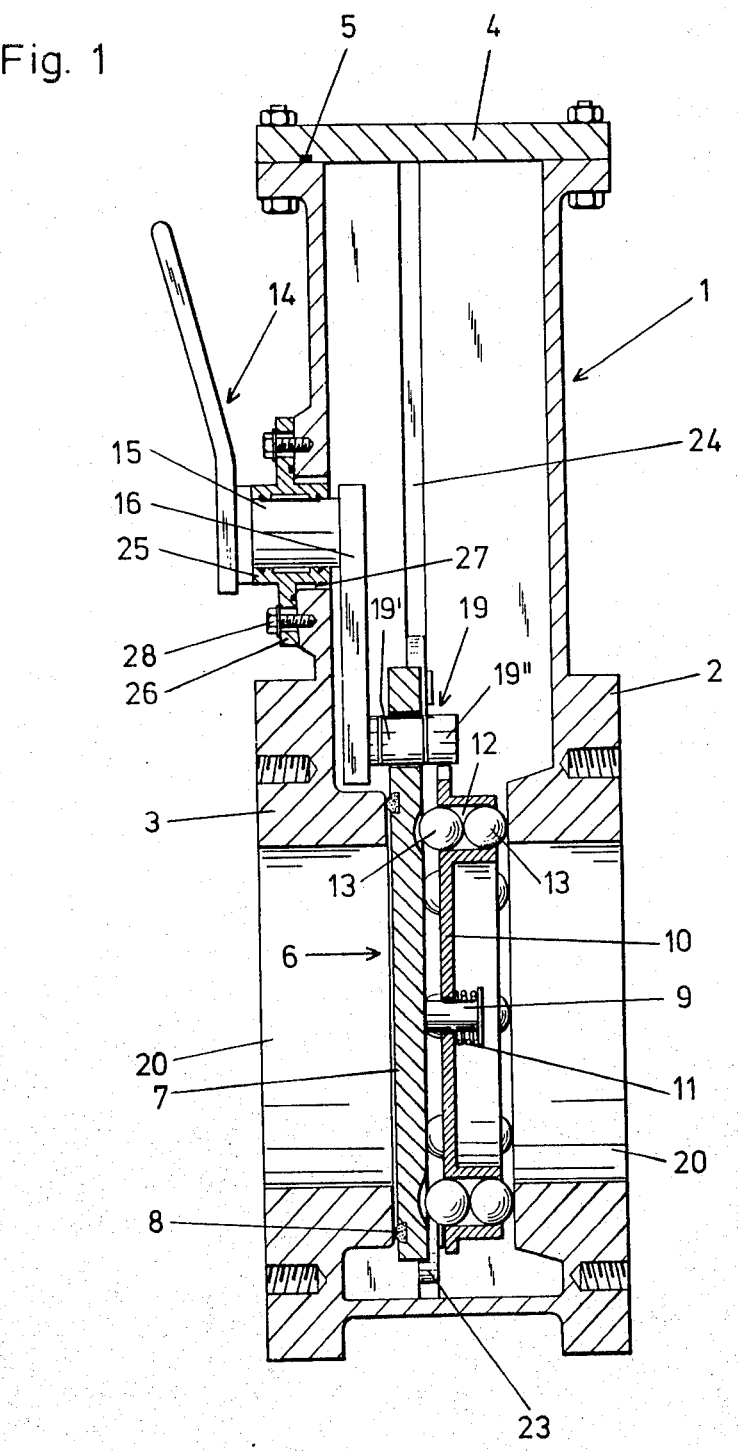
FIG. 1 is a longitudinal sectional view taken through a slide valve assembly in accordance with the present invention shown in the closed and sealed position.
Figure 2:
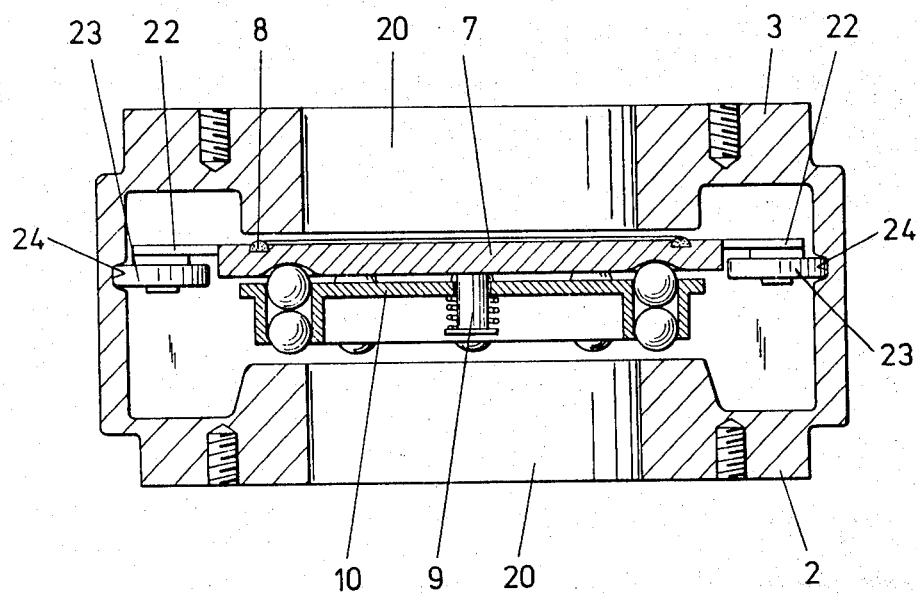
FIG. 2 is a cross-sectional view taken across the assembly of FIG. 1 wherein the slide valve is shown in the unlocked but unopened position.
Figure 3:
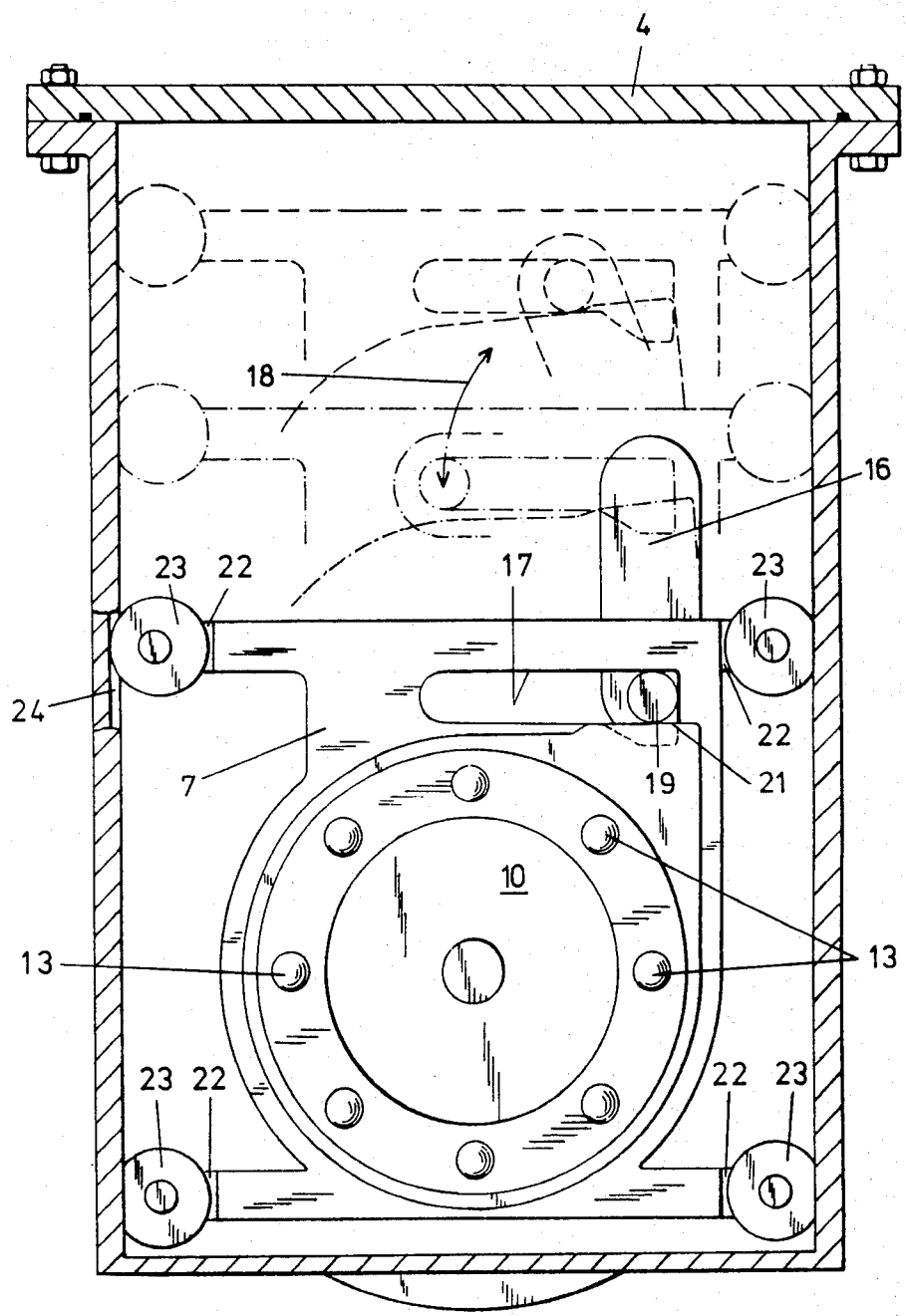
FIG. 3 is a plan view of the valve assembly with the housing shown in section schematically depicting various positions of the valve closure body.

Referring now to the drawings, and particularly to FIGS. 1, 2, and 3 wherein a first embodiment of the invention is shown and wherein like reference numerals are used to refer to similar parts, the slide assembly of the invention is shown as including a housing 1 which may be welded or cast and which includes a pair of flanges 2 and 3 having corresponding threaded bore holes for connection thereto of pipes. Toward the top thereof, the housing is closed by means of a cover 4 having a seal 5. The valve assembly includes a valve closure body 6 which is supported within the housing 1 so as to be displaceable within the plane of the closure body 6. It will be noted that the closure body 6 is generally planar in form and therefore, as viewed in FIG. 1, the closure body is movable vertically within its own plane.

The closure body 6 includes a sealing plate 7 and a counter element 10. The sealing plate 7 has formed thereon a valve seal member 8 and a pin 9 which is generally centrally arranged. The valve seal 8 rests against a valve seat defined by the housing 1 and the counter element 10 is arranged so as to be freely rotatable relative to the sealing plate 7 about the pin 9.

A spring 11 extending between the head of the pin 9 and the counter element 10 presses the counter element 10 against the sealing plate 7. The counter element 10 is formed with recesses or ball chambers 12 on its circumference within an arrangement generally coextensive with the seal 8. In the chambers 12, spreading elements in the form of balls 13 are provided with the balls 13 projecting beyond the ball chambers 12 but arranged so as to be held within the chambers 12. The balls 13 contact the rear of the sealing plate 7 and recesses are provided in the rear face of the plate 7 for engagement with the balls 13. During relative rotation between the sealing plate 7 and the counter element 10, the balls 13 run into the recesses and press apart the counter element 10 and the sealing plate 7 and accordingly they brace or spread in the pass-through direction of the valve.

In the spreading position, the balls 13 directly contact the inner wall of the housing along the circumference of a pass-through opening 20.

The assembly is provided with a simple crank drive mechanism 14 which in the embodiment shown in FIG. 1 operates to displace the closure valve for opening and closing of the valve assembly. The crank drive mechanism 14 may be actuated manually or it also may be actuated by a motor or a piston-cylinder unit. The crank mechanism 14 includes a crank axle 15 which is guided in sealed engagement through the side of the housing and the crank arm 15 is formed with a working connection with the closure body 6. The closure body 6 is displaceable within its own plane in the housing 1 through a path of movement which is controlled by guide means which include guide rollers 23 and guide slots 24 formed in the housing. The rollers 23 are held in place by laterally projecting leaf spring clips 22 arranged at the sealing plate 7, the clips 22 extending in the plane of the sealing plate 7 and carrying the rollers 23 at their ends. The rollers 23 are mounted to be freely rotatable and to run in the guides 24 which are formed in the housing. The guides 24 are generally trapezoidal in crosssection (see FIG. 2) with outwardly diverging flanks. The axes of the rollers 23 lie at the corner points of an imaginary square, as best seen in FIG. 3, and they support the sealing plate when it moves in the housing.

The sealing plate 7 includes a connecting link guide slot 17 on a side face of the sealing plate 7 which faces the crank drive 14, the connecting link guide slot 17 extending substantially traversely relative to the displacement direction, indicated by the arrow 18, of the closure body 6.

In the embodiment depicted in FIGS. 1-3, the guide slot 17 is formed as an oblong slot with parallel straight flanks. A connecting link slide member 19 is connected with the crank arm 16 and engages in the guide slot 17. The engagement of the slide member 19 and the guide slot 17 is such that the member 19 moves along the connecting link guide slot 17 when the crank rod arrangement 14 is actuated.

In a slide valve assembly of the type according to the present invention, three positions are possible, with these positions including first, the open position which is shown in FIG. 1 in dashed line form in which the closure body 6 is located laterally relative to the pass-through opening 20 of the valve assembly. Secondly, the closing position is a position in which the closure body 6 is moved in the pass-through opening 20 of the valve assembly (FIG. 2) but in which position the sealing plate 7 is not yet pressed against the valve seat. The third or sealing position in which the sealing plate is sealingly pressed at the valve seat is shown in FIG. 1.

The counter element 10 has a circumferential edge or periphery 21 which, when the closure body 6 is opened or in the closing position, respectively, projects into the area or path to be traversed by the slide member 19. When the valve is sealingly closed (FIG. 1) and the connecting link slide member 19 moves into the end position seen in FIG. 1 during further rotation of the crank 14 over its possible adjustment area, the counter element 10 rotates around the pin 9 whereby the sealing plate 7 and the counter element 10 are forced apart by means of the rotational movement in a manner previously described. The guide slot 17 is dimensioned with an elongated configuration so that, in the sealing position of the valve, the crank will be located in or approximately over its dead center or dead position of the valve. Once closed, it remains in its sealing position without requiring the application of holding forces from outside of the crank drive.

The circumferential edge 21 of the counter element 10 extends relative to the axis of the guide slot 17 toward its end so as to ascend with a sloping configuration (FIG. 1) and the turning angle of the counter element 10 increases relative to the sealing plate 7 when the connecting line slide member 19 moves into its end position.

It will be seen in FIG. 1 that the connecting link slide member 19 is formed to comprise two rollers 19' and 19" which are arranged on a common axis and which are supported so as to be freely rotatable. One roller 19' is in working engagement with the guide slot 17 and the other roller 19" is adapted to roll on the circumferential edge 21 of the counter element 10.

As a result of the construction in accordance with the present invention, it no longer becomes necessary to support one of the two parts forming the closure body by means of stops nor is it necessary to displace faces relative to one another under pressure during the sealing closure. In this new construction, stops of the conventional type may be eliminated.

It is advisable if the crank axle 15 is supported in a bearing sleeve 25 with a flange 26 wherein the guide-through opening 27 in the housing has a somewhat larger diameter than the inner part of the bearing sleeve and the crank axle 15 may be displaced somewhat or offset laterally after loosening or detachment of a flange screw 28 in order to adjust the sealing plate 7 accurately on the valve seat.

Figure 4:
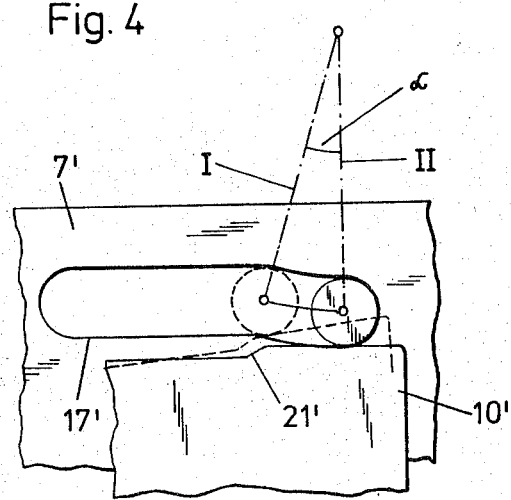
FIG. 4 is a schematic partial view of parts of the valve assembly depicting another embodiment of the invention.

In the embodiment disclosed in FIGS. 1-3, the sealing plate 7, because of the linear course of the connecting link guide slot 17, moves approximately transversely to its plane during the actual closing process and the seal 8 undergoes a rolling movement, albeit a slight one, specifically during the time period between the first contact of the seal 8 with the valve seat to the moment when the final closing pressure is applied. In FIG. 4 there is shown a further embodiment of the invention wherein, in order to eliminate this disadvantage, it is further provided that the connecting link guide slot 17' of the sealing plate 7' extends in a arc form in the area in which the circumferential edge 21' of the counter element 10' intersects and overlaps the connecting link guide slot 17' when the valve is open. The arc of the edge 21' is formed with a radius of curvature which is equal to the crank radius or throw of the crank arm. By means of this construction of the guide slot 17' the sealing plate 7' may be held in the closing position into which it moves during the time that the crank arm is in a position I. The crank arm must be further rotated through an angle α in order to close the valve when the crank arm is brought into a position II. When the crank arm is rotated through the angle α from position I into position II and vice versa, the sealing plate 7' will be moved in a direction perpendicular to its plane and any transverse stress of the seal is removed.

Although the slide valve assembly described above is adapted particularly for employment in high vacuum apparatus, it may also be employed with other devices where such an extreme vacuum is not necessarily applied. The valve assembly may be employed as an actual closing device but there is no reason why it should not be employed as a control valve. Though a crank drive is discussed for actuation of the closure body, this does not necessarily exclude utilization of a linear drive. That is, a different kind of connecting rod or thrust rod may also be employed for actuation of the valve body. In this case, such a connecting rod may have a one-sided lever member in a working connection with the connecting slot 17 or 17' and by means of such a lever the final closing movement may be achieved during employment in accordance with the operation of the valve.

In the case of any repair or other restructuring of the device, it is only necessary for the cover 4 to be detached and the closure body may be pivoted into its open position. It can be removed entirely from the housing after the connecting link slide member 19 is removed.

The recesses on the rear side of the sealing plate 7 are formed with trough-like sloped faces and extend along an arc area equal to or even larger than the angular adjustment area of the counter element 10 so that the balls 13 contact the sloped faces in the spreading position of the closure body and can also roll them back into their deepest position under the action of the spring 11. Accordingly, they may cancel the spreading movement as soon as the connecting link slide member 19 releases the circumferential edge 21 of the counter element as a result of a renewed swinging or pivoting movement of the crank drive 14.

Thus, from the foregoing it will be seen that in the operation of the valve of the present invention, the valve closure body is moved between an open position indicated in dotted line form at the top of FIG. 3 and a closed position indicated in solid line form at the bottom of FIG. 3. After the valve is moved to the closed position, a further rotation of the crank drive mechanism 14 will cause the roller 19" to engage the edge 21 of the counter element 10 which will then be rotated relative to the sealing plate 7 in a manner in order to enable the balls 13 to be placed in a position where a pressure will be applied against the sealing plate 7 tending to effect sealing engagement of the seals 8 against the valve seat defined by the housing 1.

While specific embodiments of the invention have been shown and described in detail to illustrate the application of the inventive principles, it will be understood that the invention may be embodied otherwise without departing from such principles.

What is claimed is:

1. A slide valve assembly particularly for fluid-tight closure of flow passages in high vacuum apparatus comprising:

housing means defining a valve seat;
   a generally planar valve closure member comprising a sealing plate and a counter element, said sealing plate being adapted to be brought into sealing engagement against said valve seat so as to close said valve assembly;
   a crank rod mechanism for moving said valve closure member between a valve-open position and a valve-closed position;
   spreading elements arranged at said closure member so as to be supported against said sealing plate and said counter element in order to spread apart said sealing plate and said counter element to press said sealing plate against said valve seat to effect sealing closure of said valve assembly;
   guide means interposed between said valve closure member and said housing means for guiding movement of said closure member along a displacement path generally in its own plane;
   a connecting link slide member on said crank rod mechanism engaging said closure member;
   a connecting link guide slot formed in said sealing plate and extending transversely to the displacement direction of said closure member for receiving said connecting link slide member therein;
   said counter element being constructed as a disc rotatable relative to said sealing plate and with a circumferential edge which projects into the path of said connecting link slide member;
   said crank rod mechanism operating to actuate said sealing plate through engagement of said connecting link slide member in said connecting link guide slot and to also actuate said counter element for rotative movement relative to said sealing plate by engagement of said slide member against said circumferential edge.

2. An assembly according to claim 1 wherein said connecting link slide member is formed of two adjacent freely rotatable rollers arranged on a common axis, one of said rollers engaging in said connecting link guide slot of said sealing plate and the other of said rollers engaging at said circumferential edge of said counter element.

3. An assembly according to claim 1 wherein said connecting link guide slot of said sealing plate is formed with an arc-shaped configuration and wherein said circumferential edge of said counter element intersects the path of movement of said connecting link guide member, said crank rod mechanism having a crank arm with a crank arm radius which is equal to the radius of curvature of said arc-shaped connecting link guide slot.

4. An assembly according to claim 1 wherein said guide means comprise sliding elements engaging said housing and connected with said sealing plate by means of clip-type leaf springs, said sliding elements being constructed as rollers having rotational axes which extend at right angles to the plane of said closure member.

5. An assembly according to claim 1 wherein said spreading elements comprise spherical balls engaged within said counter element and recesses formed in said sealing plate, with relative rotative movement between said counter element and said sealing plate causing said balls to be brought in engagement between said housing means and said sealing plate to apply to said sealing plate a force tending to effect sealing engagement thereof against said valve seat.

6. An assembly according to claim 5 wherein said spreading elements directly contact the inside of said housing when said valve assembly is closed.

7. An assembly according to claim 4 wherein said sliding elements are formed with axes which are located at corner points of an imaginary square.

8. An assembly according to claim 5 wherein spring means are interposed between said counter element and said sealing plate and wherein said sealing plate and said counter element are moved relative to each other in directions perpendicular to the plane of said closure member as a result of engagement of said slide member against said circumferential edge to effect a sealing force between said sealing plate and said counter element by operation of said spreading elements.

* * * * *